United States Patent
Wamprecht et al.

[11] Patent Number: 6,162,891
[45] Date of Patent: Dec. 19, 2000

[54] POLYESTER POLYOLS AND THEIR USE IN TWO-COMPONENT POLYURETHANE LACQUERS

[75] Inventors: Christian Wamprecht, Neuss; Michael Sonntag, Odenthal; Jürgen Meixner, Krefeld, all of Germany

[73] Assignee: Bayer Aktiengesellschaft, Leverkusen, Germany

[21] Appl. No.: 08/352,664

[22] Filed: Dec. 9, 1994

[30] Foreign Application Priority Data

Dec. 20, 1993 [DE] Germany .............................. 43 43 452

[51] Int. Cl.$^7$ .................................................. C08G 18/42
[52] U.S. Cl. ........................... 528/303; 528/81; 560/193; 525/440; 252/182.25
[58] Field of Search ...................... 528/81, 303; 560/193; 525/440; 252/182.25

[56] References Cited

U.S. PATENT DOCUMENTS

| | | | |
|---|---|---|---|
| 3,554,951 | 1/1971 | Blomeyer et al. | 260/29.1 |
| 4,894,430 | 1/1990 | Höhlein et al. | 528/75 |
| 5,260,138 | 11/1993 | Höhlein et al. | 428/480 |
| 5,319,056 | 6/1994 | Wamprecht et al. | 528/49 |

FOREIGN PATENT DOCUMENTS 4337432  5/1995  Germany .

OTHER PUBLICATIONS

G. Oertel, Herausberger Kunststoff Handbuch Bd. 7, Polyurethane, 3,. Auflage' 1993 (Month unavailable) pp. 555–565.

*Primary Examiner*—Rachel Gorr
*Attorney, Agent, or Firm*—Joseph C. Gil; Thomas W. Roy

[57] ABSTRACT

The present invention relates to polyester polyols having hydroxyl numbers of 175 to 520 which are the reaction products of a) 50 to 60 mole % of a polyol component containing
  (i) 0 to 39 mole % of one or more dihydric aliphatic or cycloaliphatic alcohols having at least 2 carbon atoms other than neopentyl glycol,
  (ii) 20 to 59 mole % of neopentyl glycol and
  (iii) 41 to 80 mole % of one or more at least trihydric aliphatic alcohols containing at least 3 carbon atoms and
b) 40 to 50 mole % of a dicarboxylic acid component containing
  (iv) 0 to 60 mole % of one or more aliphatic or cycloaliphatic, saturated or unsaturated dicarboxylic acids or their anhydrides having at least 2 carbon atoms other than fumaric acid, itaconic acid and maleic acid or their anhydrides and
  (v) 40 to 100 mole % of one or more of fumaric acid, itaconic acid, maleic acid or their anhydrides, wherein the percentages set forth in a) and b) each add up to 100.

The present invention also relates to the use of these polyester polyols, optionally in admixture with other organic polyhydroxyl compounds, as a binder component for two-component polyurethane lacquers also containing lacquer polyisocyanates, more particularly for the production of lacquer coatings on large vehicles and in car repair lacquering.

5 Claims, No Drawings

POLYESTER POLYOLS AND THEIR USE IN TWO-COMPONENT POLYURETHANE LACQUERS

BACKGROUND OF THE INVENTION

1. Field of the Invention

This invention relates to new special polyester polyols based on selected starting materials and to their use as a binder component in two-component polyurethane lacquers (2C PUR lacquers), preferably as lacquers for large vehicles and repair lacquers for cars.

2. Description of the Prior Art

It is known that substrates of low flexibility, such as metal or wood, can be coated with two-component polyurethane lacquers based on hydroxy-functional polyesters, polyethers or polyacrylates and organic polyisocyanates. The resulting lacquer coatings are distinguished in particular by excellent hardness, very good adhesion and high weathering resistance. The chemical bases of these lacquers and coatings are described inter alia in "Lackkunstharze", Hans Wagner/Hans Friedrich Sarx, Carl Hanser Verlag, München, pages 153 to 173, 1971.

However, known two-component polyurethane lacquers, mainly those based on aromatic polyester polyols, often lead to lacquer coatings having a tendency to yellow, particularly on exposure to short-wave UV light, and frequently failing to satisfy the requirements for weathering-, chalking- and yellowing-resistant coatings in car repair and large vehicle lacquering.

A typical example of coating compositions which are susceptible to yellowing are the binders according to DE-AS 1,271,867. Although lacquers based on these binders (aromatic polyester polyols/polyisocyanates based on hexamethylene diisocyanate) show no reduction in gloss, no sign of chalking nor any change in color after 2000 weatherometer hours, they undergo distinct yellowing after 1000 h exposure to short-wave UV light.

A significant improvement in the susceptibility to yellowing of 2C PUR lacquers on exposure to short-wave UV light can be obtained with the polyester polyols described in EP-A-0,318,800. However, these polyester polyols are not suitable for the production of 2C PUR lacquers for car repair and large vehicle lacquering because the drying time (predrying and full drying) is too long and the resulting lacquer films are highly elastic and, accordingly, do not have the required surface hardness.

EP-A-0,494,442 describes heat-curing one-component coating compositions which also form UV-resistant lacquers. However, the polyester polyols used in these coating compositions are unsuitable for use as the polyol component in 2C PUR lacquers for car repair and large vehicle lacquering because the degree of branching, the hardness and the OH content of the polyesters are too low to obtain quick-drying, hard lacquer films resistant to solvents and chemicals.

Accordingly, an object of the present invention is to provide new two-component polyurethane lacquers, particularly for car repair and large vehicle lacquering, which meet the following requirements:

1. Non-yellowing film surfaces on exposure to short-wave UV light

The lacquer film must withstand exposure to short-wave UV light (wavelength <400 nm) for at least 1000 hours without yellowing.

2. Rapid drying at room temperature

The lacquer film should be sand-dry after about 2 h and fully dry after about 8 h (DIN 53150).

3. Very good resistance to solvents and chemicals

The lacquer film must not be damaged by typical lacquer solvents such as xylene, butyl acetate, acetone, methylethyl ketone and high-octane fuel; or by chemicals such as sodium hydroxide, sulfuric acid, wood resin, pancreatin and tar.

4. Good light and weathering resistance

The lacquer film should show no reduction in gloss, no sign of chalking nor any change in color after 2000 weatherometer hours and after outdoor weathering in an industrial climate.

5. High film hardness and mechanical stability

The lacquer film should have reached its final hardness (pendulum damping >120 s), i.e., should be scratch- and abrasion-resistant, after 2 days.

6. Adequate pot life

Freshly prepared lacquers must have a pot life of at least 6 hours, i.e., their viscosity measured as the flow time from a DIN 4 mm cup should not double in 6 hours.

It has now surprisingly been found that these objects, in particular, yellowing-resistant, quick-drying, hard lacquer films with favorable resistance properties, can be obtained by using the polyester polyols according to the invention based on selected starting materials which are described in detail hereinafter as the polyhydroxyl component or as an essential part of the polyhydroxyl component in two-component polyurethane lacquers.

SUMMARY OF THE INVENTION

The present invention relates to polyester polyols having hydroxyl numbers of 175 to 520 which are the reaction products of a) 50 to 60 mole % of a polyol component containing
  (i) 0 to 39 mole % of one or more dihydric aliphatic or cycloaliphatic alcohols having at least 2 carbon atoms other than neopentyl glycol,
  (ii) 20 to 59 mole % of neopentyl glycol and
  (iii) 41 to 80 mole % of one or more at least trihydric aliphatic alcohols containing at least 3 carbon atoms and b) 40 to 50 mole % of a dicarboxylic acid component containing
  (iv) 0 to 60 mole % of one or more aliphatic or cycloaliphatic, saturated or unsaturated dicarboxylic acids or their anhydrides having at least 2 carbon atoms other than fumaric acid, itaconic acid and maleic acid or their anhydrides and
  (v) 40 to 100 mole % of one or more of fumaric acid, itaconic acid, maleic acid or their anhydrides, wherein the percentages set forth in a) and b) each add up to 100.

The present invention also relates to the use of these polyester polyols, optionally in admixture with other organic polyhydroxyl compounds, as a binder component for two-component polyurethane lacquers also containing lacquer polyisocyanates, more particularly for the production of lacquer coatings on large vehicles and in car repair lacquering.

DETAILED DESCRIPTION OF THE INVENTION

The polyester polyols according to the invention differ in their chemical composition both from the polyester polyols according to EP-A-0,318,800 and from the polyester polyols according to applicants' earlier German patent applications P 42 17 363.9 and P 43 37 432.8. In addition, the polyester polyols according to the invention are intended, in particular, for a field of application which is not mentioned in the earlier documents cited.

The particular suitability of the polyester polyols for the use according to the invention is attributable to the choice of the starting materials on which the polyester polyols are based and, in particular, the quantity ratio between them. The polyester polyols critical to the invention have hydroxyl numbers of 175 to 520, preferably 200 to 450 and more preferably 250 to 400; acid numbers of 1 to 80, preferably 5 to 50 and more preferably 10 to 30; and an average molecular weight (which may be calculated from the stoichiometry of the starting materials) of 600 to 10,000 and preferably 600 to 5,000. The polyester polyols according to the invention are highly viscous, substantially colorless, dear resins which form clear solutions in lacquer solvents, e.g., hydrocarbons such as toluene, xylene and higher alkyl benzenes; esters such as ethyl acetate, propyl acetate, butyl acetate, methyl glycol acetate, ethyl glycol acetate and methoxypropyl acetate; ketones such as acetone, methylethyl ketone and methyl isobutyl ketone; and mixtures of these solvents.

It is crucial to the invention that the polyester polyols are prepared from synthesis components a) and b). Polyol component a) is made up of individual constituents (i) to (iii). Component (i) is selected from dihydric, aliphatic or cycloaliphatic alcohols containing at least 2, preferably 2 to 18 and more preferably 2 to 6 carbon atoms other than neopentyl glycol. Examples include ethylene glycol, propane-1,2- and -1,3-diol, butane-1,3-, -2,3- and -1,4-diol, pentane-1,5-diol, hexane-1,6-and -2,5-diol, 2-methylpentane-2,4-diol, 3-methylpentane-1,5-diol, 2-methyl-2-propylpropane-1,3-diol, 2,2-diethylpropane-1,3-diol, cyclohexane-1,2- and -1,4-diol, 1,4-cyclohexane dimethanol, 2,2-bis-(4-hydroxycyclohexyl)-propane and octahydro4,7-methano-1H-indene dimethanol. Mixtures of such diols may also be used as component (i). Component (i) is used in a quantity of 0 to 39 mole %, preferably 0 to 20 mole % and more preferably 0 to 10 mole %, based on the total weight of components (i) to (iii).

Component (ii) is neopentyl glycol (2,2-dimethylpropane-1,3-diol) and is present in quantities of 20 to 59 mole %, preferably 30 to 50 mole % and more preferably 35 to 45 mole %, based on the total weight of components (i) to (iii).

Component (iii) is selected from at least trihydric, aliphatic alcohols containing at least 3, preferably 3 to 6, carbon atoms. Examples include glycerol, trimethylol propane, pentaerythritol and mixtures of these alcohols. Component (iii) is used in a quantity of 40 to 80 mole %, preferably 50 to 70 mole % and more preferably 55 to 65 mole %, based on the total weight of components (i) to (iii).

Dicarboxylic acid component b) is a mixture of components (iv) and (v). The mixture contains 0 to 60 mole %, preferably 0 to 40 mole % and more preferably 0 to 20 mole % of component (iv) and 40 to 100 mole %, preferably 60 to 100 mole % and more preferably 80 to 100 mole % of component (v), based on the total weight of components (iv) and (v).

Component (iv) is selected from aliphatic or cydoaliphatic, saturated or unsaturated dicarboxylic acids or their anhydrides containing at least 2 carbon atoms other than fumaric acid, itaconic acid and maleic acid or their anhydrides. Examples include oxalic acid, malonic acid, succinic acid, succinic anhydride, glutaric acid, adipic acid, pimelic acid, suberic acid, azelaic acid, hexahydrophthalic acid, hexahydrophthalic anhydride, tetrahydrophthalic acid and tetrahydrophthalic anhydride. Mixtures of these acids or anhydrides may of course also be used.

Component (v) is a dicarboxylic acid selected from fumaric acid, maleic acid and itaconic acid or an anhydride of the last two acids mentioned or a mixture of such acids or anhydrides. In a particularly preferred embodiment, component (v) is maleic anhydride.

The percentages mentioned in connection with each of components a) and b) add up to 100. In the production of the polyester polyols, component a) is used in a quantity of 50 to 60 and preferably 52 to 58 mole % while component b) is used in a quantity of 40 to 50 and preferably 42 to 48 mole %, wherein these percentages add up to 100.

The polyester polyols crucial to the invention are produced in known manner by the methods described in detail, for example, in "Ullmanns Encyclopädie der Technischen Chemie", Verlag Chemie Weinheim, 4th Edition (1980), Vol. 19, pages 61 et seq. or by H. Wagner and H. F. Sarx in "Lackkunstharze", Carl Hanser Verlag, München (1971), pages 86 to 152. The esterification reaction is optionally carried out in the presence of a catalytic quantity of typical esterification catalysts, e.g., acids, bases or transition metal compounds, such as titanium tetrabutylate, at about 80 to 260° C., preferably at 100 to 230° C. The esterification reaction is continued until the required hydroxyl and acid values are reached.

However, it is also possible in principle to terminate the esterification reaction below the required acid value and then to adjust the required acid value by subsequent reaction of the polyester formed with a dicarboxylic acid anhydride in a semiester-forming reaction. Suitable dicarboxylic anhydrides include maleic anhydride, succinic anhydride, tetrahydrophthalic anhydride and hexahydrophthalic anhydride.

In the use according to the invention, the polyester polyols crucial to the invention are optionally used in admixture with other organic polyhydroxyl compounds known from polyurethane lacquer technology as the polyhydroxyl component. These other polyhydroxyl compounds include the known polyester, polyether or polyacrylate polyols. Known polyacrylate polyols are preferably used as the additional organic polyhydroxyl compound if any are used at all in addition to the polyester polyols crucial to the invention.

Suitable polyacrylate polyols include copolymers, which are soluble in the previously disclosed lacquer solvents, of hydroxy-functional monomers with other olefinically unsaturated monomers such as butyl acrylate, methyl methacrylate, styrene, acrylic acid, acrylonitrile and/or methacrylonitrile. Suitable hydroxy-functional monomers are, in particular, 2-hydroxyethyl (meth)acrylate and the hydroxypropyl/(meth)acrylate isomer mixture obtained by addition of propylene oxide to acrylic acid or methacrylic acid. The hydroxyl group content of these polyacrylate polyols is generally 1 to 5% by weight.

In the use according to the invention, the polyester polyols according to the invention may be used in admixture with up to 90 hydroxyl equivalent-%, preferably up to 50 hydroxyl equivalent- %, based on all the polyhydroxyl compounds, of the other polyols previously described. In a particularly preferred embodiment, however, the polyester polyols according to the invention are used as sole polyol component.

Reactants for the polyol component in the use according to the invention are the known "lacquer polyisocyanates", preferably the known urethane-modified or more preferably biuret-modified or isocyanurate-modified monomeric diisocyanates such as 1,6-diisocyanatohexane, 1-isocyanato-3,3,5-trimethyl-5-isocyanatomethyl cydohexane (isophorone diisocyanate), 2,4-diisocyanatotoluene and mixtures of this latter diisocyanate with up to 35% by weight, based on the weight of the mixture, of 2,6-diisocyanatotoluene and mixtures of these diisocyanates. In a particularly preferred embodiment, the "lacquer polyisocyanates" are based on diisocyanates containing aliphatically and/or cycloaliphatically bound isocyanate groups.

The "lacquer polyisocyanates" containing urethane groups include the reaction products of 2,4- and optionally 2,6-diisocyanatotoluene with less than equivalent quantities of trimethylol propane or mixtures thereof with diols such as the isomeric propane or butane diols. The production of these urethane-containing lacquer polyisocyanates in substantially monomer-free form is described, for example, in DE-PS 1,090,196.

The preferred biuret-modified lacquer polyisocyanates include in particular those based on 1,6-diisocyanatohexane, which may be produced as described, for example, in EP-B1 0,003,505, DE-PS 1,101,394, U.S. Pat. No. 3,358,010 or U.S. Pat. No. 3,903,127.

The similarly preferred isocyanurate-modified lacquer polyisocyanates include in particular the trimers or mixed trimers of the preceding monomeric diisocyanates such as the isocyanurate-modified polyisocyanates based on diisocyanatotoluene according to GB-PS 1,060,430, GB-PS 1,506,373 or GB-PS 1,485,564; the mixed trimers of diisocyanatotoluene with 1,6-diisocyanatohexane obtained, for example, in accordance with DE-PS 1,644,809 or DE-OS 3,144,672; and preferably the aliphatic or aliphatic-cyloaliphatic trimers or mixed trimers based on 1,6-diisocyanatohexane and/or isophorone diisocyanate which may be obtained, for example, in accordance with U.S. Pat. No. 4,324,879, U.S. Pat. No. 4,288,586, DE-OS 3,100,262, DE-OS 3,100,263, DE-OS 3,033,860 or DE-OS 3,144,672. The lacquer polyisocyanates generally have an isocyanate content of 5 to 25% by weight; an average NCO functionality of 2.0 to 5.0, preferably 2.8 to 4.0; and a residual content of the monomeric diisocyanates used in their production of less than 2% by weight, preferably less than 0.5% by weight. Mixtures of these lacquer polyisocyanates may also be used.

In the two-component polyurethane lacquers the polyol component and the polyisocyanate component are present in quantities corresponding to an equivalent ratio of isocyanate groups to hydroxyl groups of 5:1 to 1:2, preferably 1.5:1 to 1:1.2. The two-component binders obtained by mixing the two components have only a limited pot life of about 4 to 48 hours and may be processed either as solventless clear lacquers or preferably in admixture with known additives. These optional additives may be added either to the mixture or to the individual components before they are mixed.

Suitable additives include solvents such as ethyl acetate, butyl acetate, methoxypropyl acetate, methylethyl ketone, methyl isobutyl ketone, toluene, xylene, white spirit and mixtures of these solvents. The solvents are used in a quantity of up to 70% by weight, preferably up to 40% by weight, based on the weight of the coating composition.

Other optional additives include plasticizers such as tricresyl phosphate, phthalic acid diesters and chloroparaffins; pigments and fillers such as titanium dioxide, barium sulfate, chalk and carbon black; catalysts such as N,N-dimethyl benzylamine, N-methyl morpholine, zinc octoate, tin(II) octoate and dibutyl tin dilaurate; flow control agents; thickeners; stabilizers such as substituted phenols; organofunctional silanes as coupling agents; light stabilizers; and UV absorbers. Suitable light stabilizers include sterically hindered amines of the type described, for example, in DE-OS 3,993,655 (=U.S. Pat. No. 4,123,418 and U.S. Pat. No. 4,110,304) and DE-OS 2,456,864 (=U.S. Pat. No. 3,993,655 and U.S. Pat. No. 4,221,701). Particularly preferred compounds are bis-(1,2,2,6,6-pentamethylpiperid-4-yl)-sebacate, bis-(2,2,6,6-tetramethylpiperid-4-yl)-sebacate and n-butyl-(3,5-ditert.butyl4-hydroxybenzyl)-malonic acid bis-(1,2,2,6,6-pentamethylpiperid-4-yl)-ester.

The moisture adhering to the fillers and pigments may be removed by preliminary drying or by the use of water-absorbing substances such as molecular sieve zeolites.

The drying of the lacquer films may take place at room temperature and does not require any increase in temperature to achieve the optimal properties mentioned above. However, when the binders are used as repair lacquers, an increase in temperature to about 60 to 100° C., preferably 60 to 80° C., for 20 to 60 minutes is recommended to shorten the drying and curing time.

The lacquers according to the invention are suitable for coating large vehicles such as aircraft, railway and tram car wagons, lorry superstructures and the like. They may also be used with advantage as car repair lacquers.

The particular advantages of the lacquers according to the invention in comparison with those of the prior art is their pot life in combination with their rapid drying at room temperature (the lacquer films developing their final hardness after only 1 to 2 days), their particularly high resistance to solvents and chemicals, their resistance to light and weathering coupled with good gloss retention and finally their excellent resistance to yellowing on exposure to light of short wavelength, for example short-wave UV light.

The lacquers used in accordance with the invention may be applied to the substrates to be coated by any of the methods typically used in lacquer technology such as spread coating, spray coating or dip coating. The lacquers according to the invention are suitable both for the production of base coats, intermediate coats and preferably top coats on the substrates to be lacquered.

The invention is illustrated by the following examples in which all parts and percentages are by weight unless otherwise indicated.

EXAMPLES

General procedure for the production of the polyester polyols crucial to the invention:

The polyols and the unsaturated dicarboxylic acid(s) or anhydride(s) were weighed into a reactor equipped with a stirrer, heating system, automatic temperature control, column and receiver and heated to a temperature of 100 to 150° C. while a stream of nitrogen was being passed through the inhomogeneous mixture of raw materials. After the remaining dicarboxylic acids were added, the mixture was heated with stirring to 200° C. over a period of 4 to 8 hours while during which nitrogen was passed through. The temperature measured at the head of the column was kept at a maximum of 105° C. The melt became homogeneous and clear. When the head temperature fell below 90° C., the column was removed, the stream of nitrogen was increased and condensation was completed to the required acid value.

The composition and the characteristic data of the polyesters is set forth in Examples 1 to 7. The quantities expressed in "mole" do not represent the actual number of "moles", as can be seen from the quantities by weight expressed in "g", but rather the molar ratio. The hydroxyl and acid numbers are expressed in "mg KOH/g".

| Polyester prepared from | Quantity weighed in |
|---|---|
| Example 1 (According to the invention) | |
| 1.55 moles of trimethylol propane | 1980 g |
| 1.00 mole of neopentyl glycol | 990 g |
| 1.89 moles of maleic anhydride | 1760 g |
| 0.19 moles of tetrahydrophthalic anhydride | 270 g |
| Hydroxyl number: 279 | |
| Acid number: 25 | |
| Example 2 (According to the invention) | |
| 1.55 moles of trimethylol propane | 1995 g |
| 1.00 mole of neopentyl glycol | 1000 g |
| 2.13 moles of maleic anhydride | 2005 g |
| Hydroxyl number: 280 | |
| Acid number: 28 | |
| Example 3 (According to the invention) | |
| 3.49 moles of trimethylol propane | 2080 g |
| 1.00 mole of neopentyl glycol | 463 g |
| 0.50 moles of cyclohexane dimethanol | 320 g |
| 2.97 moles of maleic anhydride | 1294 g |
| 0.85 moles of adipic acid | 552 g |
| 0.42 moles of hexahydrophthalic anhydride | 291 g |
| Hydroxyl number: 254 | |
| Acid number: 15 | |
| Example 4 (According to the invention) | |
| 1.56 moles of trimethylol propane | 1985 g |
| 1.00 mole of neopentyl glycol | 992 g |
| 1.89 moles of maleic anhydride | 1764 g |
| 0.18 moles of hexahydrophthalic anhydride | 259 g |
| Hydroxyl number: 275 | |
| Acid number: 24 | |
| Example 5 (According to the invention) | |
| 0.50 moles of pentaerythritol | 688 g |
| 0.75 moles of trimethylol propane | 1018 g |
| 1.00 mole of neopentyl glycol | 1052 g |
| 0.25 moles of hexanediol | 299 g |
| 1.54 moles of maleic anhydride | 1526 g |
| 0.27 moles of tetrahydrophthalic anhydride | 417 g |
| Hydroxyl number: 373 | |
| Acid number: 15 | |
| Example 6 (According to the invention) | |
| 1.55 moles of trimethylol propane | 2029 g |
| 1.00 mole of neopentyl glycol | 1014 g |
| 1.89 moles of maleic anhydride | 1803 g |
| 0.16 moles of succinic anhydride | 154 g |
| Hydroxyl number: 294 | |
| Acid number: 20 | |
| Example 7 (Comparison) | |
| 3.45 moles of trimethylol propane | 2495 g |
| 1.00 mole of phthalic anhydride | 799 g |
| 2.00 moles of hexahydrophthalic anhydride | 1663 g |
| 0.08 moles of maleic anhydride | 43 g |
| Hydroxyl number: 261 | |
| Acid number: 3.1 | |

Example 8 (Use)

This example describes the production of ready-to-use lacquers from the polyester polyols of Examples 1 to 7, their application and the testing of the resulting lacquer films.

To evaluate the general lacquer properties, white lacquers were prepared by providing the polyester polyols of Examples 1 to 7 with various additives and with white pigment and grinding on a Red Devil grinder.

A lacquer polyisocyanate was then added in an amount sufficient to provide an NCO:OH equivalent ratio of about 1:1. The "lacquer polyisocyanate" used was a biuret polyisocyanate based on 1,6-diisocyanatohexane and containing a mixture of N,N',N"-tris-(isocyanatohexyl)-biuret with its higher homologs dissolved in 1-methoxypropyl-2-acetate/xylene (ratio by volume 1:1) to form a 75% solution. The polyisocyanate had an NCO content of the solution of 16.5% by weight and an unreacted 1,6-diisocyanatohexane content of the solution of less than 0.5%.

Based on solid resin (total weight of the polyol and polyisocyanate solids), the following quantities of additives were used:

TABLE 1

| Components | % by weight solid on solid |
|---|---|
| Desmorapid PP, a PUR catalyst of Bayer AG, 10% in MPA | 0.3 |
| Tinuvin 292, a light stabilizer of Ciba Geigy, Basel, 10% in xylene | 1.0 |
| Titanium dioxide (Bayertitan R-KB-4 of Bayer AG) | 80.0 |
| Bentone 38, an antisedimenting agent of Kronos Titan GmbH, Leverkusen, a 10% dispersion in an 85:5 blend of Solvesso 100 solvent (available from Exxon) and Antiterra U additive (available from Byk) | 0.7 |
| Baysilone OL 17, flow control agent of Bayer AG, 10% in MPA | 0.1 |

A mixture of methoxypropyl acetate (MPA), xylene and n-butyl acetate (6:1:3) was used as solvent. It was diluted to a content of 30% by weight binder 24% by weight pigment 0.6% by weight additives 45% by weight solvent.

The flow time (DIN 53211; 4 mm nozzle) was approximately 18 seconds. Accordingly, the lacquers were ready for spraying.

The lacquers were applied to glass plates (wet film thickness approximately 100 μm) and dried both at room temperature and then for 30 minutes at 60° C. The drying rate (DIN 53150) was determined, and then the lacquers were stored for 7 days at room temperature. The dry film thickness was about 50 μm.

The König hardness (DIN 53157), the Gardner gloss at 60° C. (DIN 67530) and the dissolvability by high-octane fuel were then tested. Resistance to yellowing on exposure to short-wave UV light was then determined by the QUV test (QUV accelerated weathering tester, ASTM G 53-77). To this end, clear lacquers based on the polyester polyols of Examples 1 to 7 were applied to aluminum plates (68 mm×150 mm) which had been primed and coated with white base lacquer. To produce the clear lacquers, titanium dioxide and the Bentone additive were omitted from the formulation of Table 1 and the formulation was adjusted with a solvent mixture to a solids content of about 43%. After spraying and drying (30 minutes at 60° C.), the lacquers were stored for 7 days at room temperature and then tested in a QUV tester (manufactured by the Q-Panel Company). In this test the lacquers were exposed to intensive unfiltered UV light (wavelength range approx. 280 to 370 nm, maximum at 313 nm) for 4 h and then left in darkness for 4 h. This was repeated for a total period of 1000 h. After the sample had been washed, the total color difference ΔE (in relation to the non-weathered plate) was determined with a colorimeter as a measure of the degree of yellowing after 200 h as well as after 1000 h.

The test results of lacquers based on Examples 1 to 7 are set forth in Table 2.

TABLE 2

Test results of 2C PUR lacquers based on the polyesters of Examples 1 to 6 (according to the invention) and Comparison Example 7

| Polyester of Example | 1 | 2 | 3 | 4 | 5 | 6 | 7 |
|---|---|---|---|---|---|---|---|
| Drying[1] | | | | | | | |
| T1 (h) | 2.0 | 1.5 | 2.5 | 2.0 | 1.5 | 1.5 | 2.0 |
| T3 (h) | 6.5 | 6.0 | 7.0 | 6.0 | 5.5 | 6.0 | 6.0 |
| Pendulum hardness: | | | | | | | |
| 23° C. + 7 c (s) | 138 | 135 | 145 | 140 | 142 | 130 | 150 |
| 30' 60° C. = 7 d (s) | 182 | 175 | 189 | 187 | 185 | 172 | 150 |
| Gloss[2] (60°) | 95/94 | 92/91 | 94/92 | 94/93 | 92/90 | 92/91 | 95/92 |
| Resistance to high-octane fuel[3] | 0 | 0 | 0 | 0 | 0 | 0 | 0 |
| QUV test (ΔE) 200 h/1000 h | 4.5/ 6.2 | 4.1/ 5.8 | 4.8/ 6.7 | 4.0/ 6.0 | 4.7/ 6.4 | 4.1/ 5.9 | 7.3/ 13.1 |
| Erichsen indentation (mm) | 8.0 | 8.7 | 8.2 | 8.0 | 9.0 | 8.8 | 9.0 |

[1]T1 sand dry, T3 fully dry (DIN 53150)
[2]Before and after the QUV test
[3]0 = Best value (O.K.), 5 = worst value (lacquer film dissolved)

Discussion of the results

After rapid drying, 2C PUR lacquers based on the polyesters of Examples 1 to 7 have a high pendulum hardness, show high gloss and were elastic and resistant to high-octane fuel. The results of the color measurements reflect the excellent UV stability of the lacquers of Examples 1 to 6 according to the invention in relation to the comparison lacquer of Example 7.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyester polyol having a hydroxyl number of 175 to 520 which is the reaction product of a) 50 to 60 mole % of a polyol component containing
  (i) 0 to 39 mole % of one or more dihydric aliphatic or cycloaliphatic alcohols having at least 2 carbon atoms other than neopentyl glycol,
  (ii) 20 to 59 mole % of neopentyl glycol and
  (iii) 41 to 80 mole % of one or more at least trihydric aliphatic alcohols containing at least 3 carbon atoms and b) 40 to 50 mole % of a dicarboxylic acid component containing
  (iv) 0 to 60 mole % of one or more aliphatic or cycloaliphatic, saturated or unsaturated dicarboxylic acids or their anhydrides having at least 2 carbon atoms other than fumaric acid, itaconic acid and maleic acid or their anhydrides and
  (v) 40 to 100 mole % of one or more of fumaric acid, itaconic acid, maleic acid or their anhydrides, wherein the percentages set forth in a) and b) each add up to 100.

2. The polyester polyol of claim 1 wherein polyol component a) contains 0 to 20 mole % of component (i), 30 to 50 mole % of component (ii) and 50 to 70 mole % of component (iii) and dicarboxylic acid component b) contains 0 to 40 mole % of component (iv) and 60 to 100 mole % of component (v).

3. The polyester polyol of claim 1 wherein polyol component a) contains 0 to 10 mole % of component (i), 35 to 45 mole % of component (ii) and 55 to 65 mole % of component (iii) and dicarboxylic acid component b) contains 0 to 20 mole % of component (iv) and 80 to 100 mole % of component (v).

4. A two-component polyurethane lacquer containing a binder comprising the polyester polyol of claim 1, optionally in admixture with other organic hydroxyl compounds, and a lacquer polyisocyanate.

5. A coating for large vehicles or for the repair of cars prepared from the two-component lacquer of claim 4.

* * * * *